United States Patent [19]

Margolin

[11] 4,432,602
[45] Feb. 21, 1984

[54] OPTICAL FIBER CLAMP AND CONNECTOR ASSEMBLY

[75] Inventor: Mark Margolin, Chicago, Ill.

[73] Assignee: TWR, Inc., Redondo Beach, Calif.

[21] Appl. No.: 253,777

[22] Filed: Apr. 13, 1981

[51] Int. Cl.³ .............................................. G02B 7/26
[52] U.S. Cl. ................................. 350/96.20; 350/96.22
[58] Field of Search ............... 350/96.20, 96.21, 96.22, 350/96.23

[56] References Cited

U.S. PATENT DOCUMENTS

| | | | |
|---|---|---|---|
| 4,110,000 | 8/1978 | Bogar et al. | 350/96.21 |
| 4,174,882 | 11/1979 | McCartney | 350/96.21 |
| 4,261,643 | 4/1981 | Stiles et al. | 350/96.20 |
| 4,274,708 | 6/1981 | Cocito et al. | 350/96.21 |

*Primary Examiner*—John D. Lee
*Attorney, Agent, or Firm*—Neuman, Williams

[57] ABSTRACT

A connector assembly for terminating optical fiber cables is disclosed which includes a fiber alignment and clamping device. The clamping device consists of a unitary body having an entrance portion for aligning a plurality of fibers in either a linear or circular parallel array. The body additionally has projecting fingers that extend on either side of a desired conductor path to form coacting pairs which may be flexed together to retain the optical fiber in a fixed axial relationship relative to its path through the connector. The flexible fingers additionally coact with adjacent fingers so that they are secured in the deflected position to hold the fiber in place, the fingers being releaseable by lateral movement thereof so as to allow removal of the fibers as desired.

18 Claims, 7 Drawing Figures

U.S. Patent  Feb. 21, 1984  4,432,602
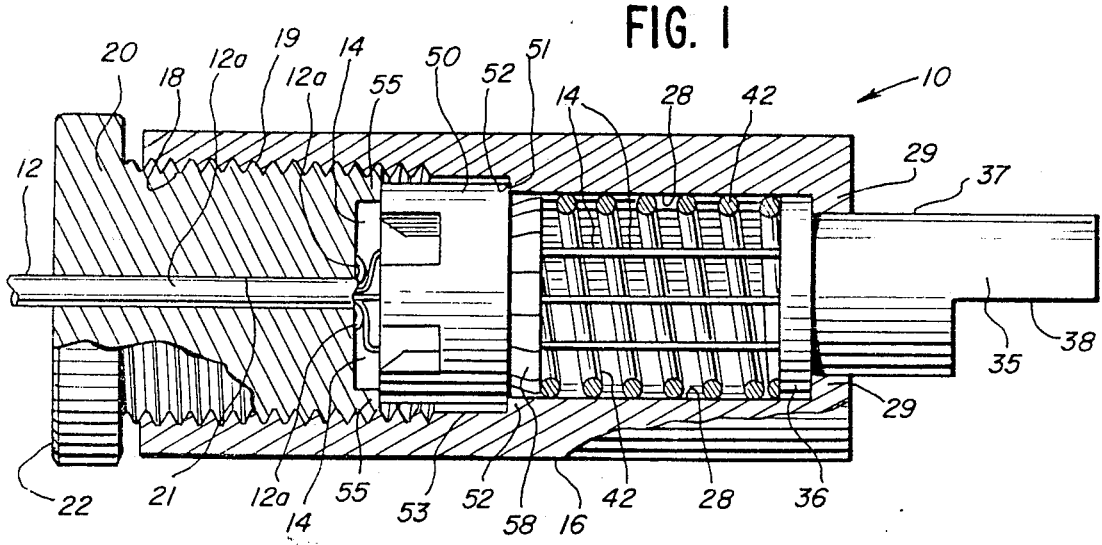
FIG. 1
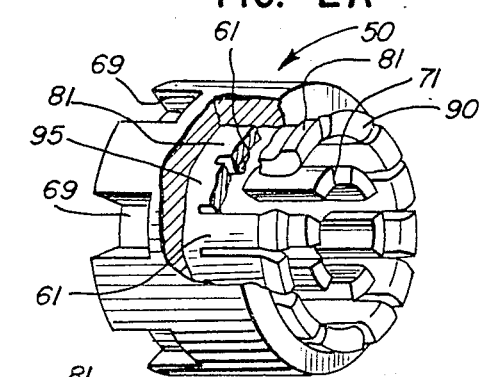
FIG. 2A
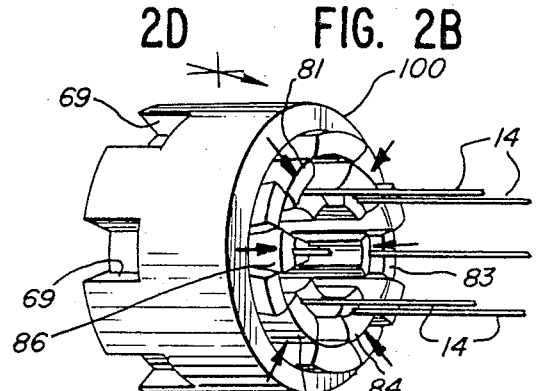
FIG. 2B
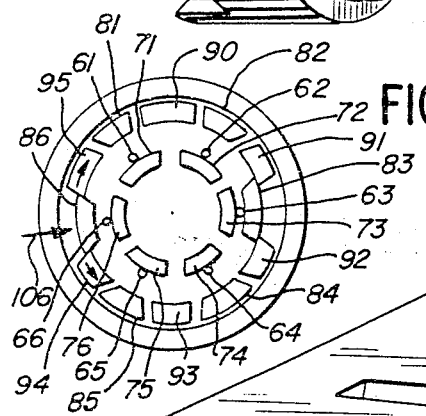
FIG. 2C
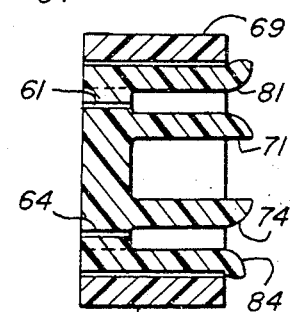
FIG. 2D
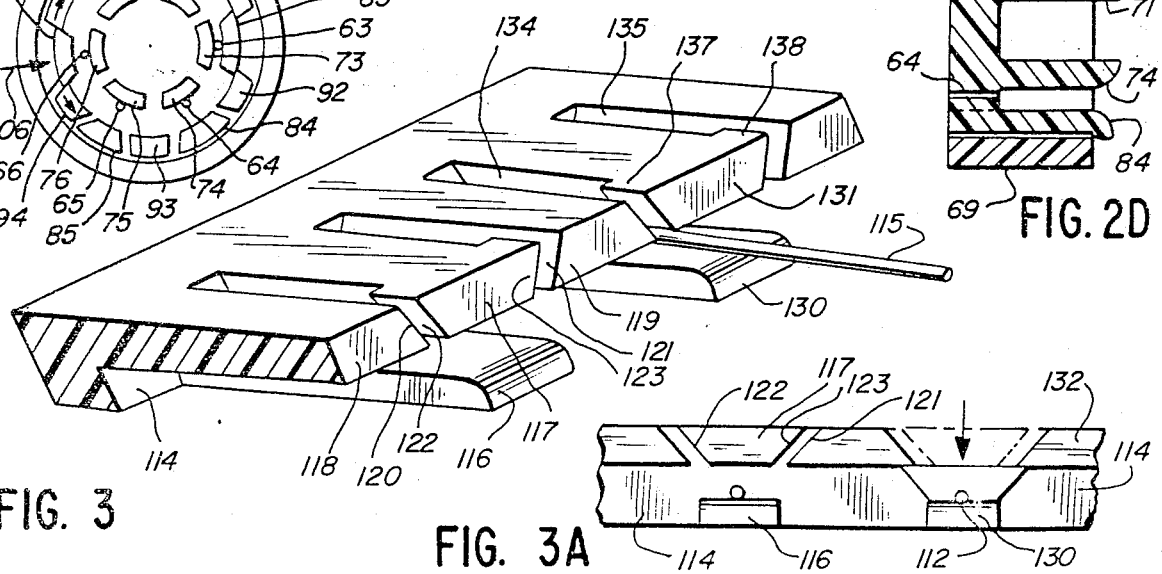
FIG. 3
FIG. 3A

OPTICAL FIBER CLAMP AND CONNECTOR ASSEMBLY

FIELD OF THE INVENTION

This invention relates generally to the field of fiber optics and, more particularly, to connector assemblies for terminating cables of multiple optical fibers.

BACKGROUND OF THE INVENTION

Fiber optic technology as a whole has advanced in recent years as a variety of techniques is being found for implementing the unique capabilities of light transmission. The telecommunications field, in particular, has begun adopting optical fibers for the transmission of information that was previously transmitted electrically. As a result, component designers have had to provide improved devices for coupling optical fiber conductors, with a goal of achieving the same degree of mechanical and energy efficiency heretofore found in purely electrical connectors. In the telecommunications industry, multi-connector electrical cables have been terminated with miniature and sub-miniature multi-contact connectors that allow substantial density in the packaging of switching apparatus. Connectors for optical fibers have been devised which provide a similar mating function for optical fibers on a multi-fiber cable. A connector of this type is set forth, for example, in the applicant's copending U.S. patent application Ser. No. 245,808 filed Mar. 20, 1981 and entitled Multichannel Optical Fiber Connector, the disclosure of which is incorporated herein by reference. That application discloses an optical fiber connector having a spring-loaded end piece which mates with a corresponding end piece of a mating connector so as to bring two optical fibers into axial alignment with each other for effective optical interconnection. The mating end pieces of the connectors slide axially around the fibers themselves during the mating process. Accordingly, connectors of this type have utilized retention devices for securing the multi-fiber optical cable assembly as a whole to the connector. This has, in some instances, been accomplished by having clamping portions on the rear of the connector which rigidly engage the outer sheath of the optical fiber cable, as set forth in the aforesaid application Ser. No. 245,808. While connectors of this type do provide a means for preventing axial movement of the cable as a whole within the connector, there is a potential with such connector assemblies for axial and torsional movement of the conductors within the outer sheath of the cable which is being retained by the connector. Additionally, connectors of this type have normally required a fan-out of the individual optical fibers within the connector body from the rather tightly compacted fiber cable to the more broadly dispersed channels at the mating end of the connector. As such, there is a potential for buckling of the individual fibers in the axial direction during the mating of complementary connector parts. In other instances, the optical fibers are held in place with adhesives, a lengthy and messy operation which is permanent in nature. As such, the clamping elements are not adjustable or reusable.

SUMMARY OF THE INVENTION

It is a primary object of the present invention to overcome certain drawbacks and limitations of multi-fiber connectors and clamping elements heretofore found in the art.

More specifically, it is an object of the invention to provide an optical fiber clamp which is economical to construct and easy to operate.

It is a related object to provide an optical fiber clamp which is adaptable to a wide variety of fiber termination and connecting apparatus.

It is another object of the present invention to provide an optical fiber clamp which requires no auxiliary element to hold it in the clamped position.

It is a further object of the invention to provide an optical fiber clamping system which is applicable to a variety of conductor orientations, including both linear and circular arrays.

It is another object of the present invention to provide an optical fiber clamp which is reusable and which, at the same time, is capable of being rapidly assembled and disassembled in a connector body.

Still another object of the invention is the provision of an optical fiber clamp which is adaptable to a plurality of fiber sizes and which can, at the same time, clamp fibers of varying diameters in a desired spatial array.

These and other objects and advantages of the present invention are achieved through the provision of a connector assembly which has been designed to incorporate a clamping and alignment element which holds the optical fibers in a uniformly spaced parallel relationship and which retains the fibers and prevents movement in the axial direction relative to the connector assembly as a whole. In this manner, the clamp assembly assists in lending to the fiber within the connector. This greatly facilitates the use of spring-loaded, slideable mating ends for the connector in the manner described above.

The clamping element is a single molded unit with integral clamping fingers arranged in a predetermined array which is typically linear or circular. The fibers are spaced and aligned in one portion of the molded unit. The fingers are cantilevered from that portion and arranged in pairs on opposite sides of the fiber paths, at least one of the fingers of each pair being deflectable toward the other to effect resilient clamping of the respective optical fiber. The deflectable finger of each pair has latching elements which hold the finger in its deflected position until forceably released by the user.

Other objects and advantages of the present invention will become apparent upon reading the attached detailed description and upon review of the drawings.

DESCRIPTION OF THE DRAWINGS

In the drawings:

FIG. 1 is a cross-sectional view of one of a pair of mating connectors for optical fibers employing a clamping and fiber alignment element constructed in accordance with the present invention;

FIG. 2A is a perspective view, partially cut away, of the optical fiber clamp of the present invention depicted in its normal relaxed form without the fibers inserted therethrough;

FIG. 2B is a perspective view of the optical fiber clamp of FIG. 2A with optical fibers extending therethrough and held into place by the deflectable fingers of the clamping elements of the present invention;

FIG. 2C is an end elevational view of the guide and clamping assembly of FIGS. 2A and 2B illustrating the deflectable clamping fingers in beginning, intermediate and end positions.

FIG. 2D is a cross-sectional view of the fiber clamp taken along the line 2D—2D of FIG. 2B.

FIG. 3 is a perspective view of an alternate embodiment of the clamping assembly of the present invention in which the clamping fingers are disposed in a linear array rather than a circular array as shown in FIGS. 2A, 2B and 2C and;

FIG. 3A is an end view of the linear clamping element shown in FIG. 3A illustrating a deflected finger in its latched position holding an optical fiber in place.

While the invention will be described in connection with certain preferred embodiments, it is to be understood that we do not intend the invention to be limited to those embodiments but rather we intend to cover all alternatives, modifications and equivalents as may be within the spirit and scope of the invention as defined by the appended claims.

DETAILED DESCRIPTION OF THE PREFERRED EMBODIMENTS

Turning first to FIG. 1, there is shown a connector half 10 in partial cross-sectional form. This connector half is adapted to mate with a similar connector half in a manner depicted in applicant's aforementioned U.S. patent application Ser. No. 245,808, the disclosure of which is incorporated herein by reference. As depicted therein and shown in FIG. 1, each connector half is designed to terminate a cable 12 housing a plurality of optical fibers 14. The cable 12 has an outer sheath 12A which is normally peeled back from the fibers and spread for retention purposes in a manner similar to that used for electrical cables.

Each of the connector halves 10 has an outer shell 16 of generally cylindrical shape. One end of the shell 16 has threads 18 formed on the inner surface thereof which are adapted to receive mating threads 19 of a cable retainer device or plug 20. The plug 20 has an elongated passageway 21 extending axially therethrough for receiving the cable 12. The plug 20 further has an expanded head portion 22 which may have a round, hexagonal or other configuration readily engagable by the user to enable him to thread the cable retaining plug 20 into the connector shell 16.

The other end of the connector shell has formed therein a cylindrical chamber 28 which is partially closed at one end thereof by a rim or shoulder section 29. A unitary resiliently movable piston member 35 is slidably mounted in the end of the connector housing 16. The piston member 35 has an enlarged end portion 36, a shank portion 37 of a lesser diameter and a hermaphroditic mating portion 38 which is described in detail in applicant's aforementioned U.S. patent application Ser. No. 245,808. As described therein, the piston member 35 mates with a similar hermaphroditic piston member of a mating connector half and includes a plurality of elongated passages extending axially in a circular array therethrough. Each of the passages is adapted to slide around one of a plurality of optical fibers inserted into the piston member from the left side thereof as viewed in FIG. 1. The apparatus for accurately registering and positioning the individual optical fibers and causing their precise engagement with similar fibers of the mating connector half will not be set forth in detail in this application but is discussed more fully in applicant's aforementioned application Ser. No. 245,808. The fiber guides through the piston member 35 are defined in even greater detail in Hodge co-pending U.S. patent application Ser. No. 968,045 filed Dec. 8, 1978. That application is commonly owned with this invention and its disclosure is also incorporated herein by reference.

For the purpose of biasing the movable piston member 35 outward from the housing 16 to the position shown in FIG. 1 there is provided a helical spring 42 which is of a diameter such that it snugly fits within the cylindrical chamber 28 while allowing the optical fibers 14 to pass within its boundaries.

In accordance with the present invention there is provided a fiber positioning and clamping device 50 for properly spacing and aligning the optical fibers 14 within the connector shell 16 while preventing axial movement thereof. This fiber positioning and clamp device 50 is shown in FIG. 1 as having a body which is secured within the connector shell 16 approximately midway through the shell. The forward outer edges 51 of the clamp device 50 rest against an interior shoulder portion 52 formed around the inner periphery of the shell 16. The shoulder portion 52 results from the fact that the cylindrical chamber 28 is of a smaller diameter than the adjacent chamber 53 in which the clamp member 50 resides. The clamp member 50 is snugly secured against the shoulder portion 52 by the force of a cylindrical projecting portion 55 of the retainer plug 20.

The fiber guide and clamp device 50, as noted above, is a semi-rigid body having entrance ports extending therethrough for axially receiving the optical fibers. The fibers are then passed through a portion of the clamp 50 in which a plurality of projecting fingers secure the fibers against axial movement. These fingers are shown generally at 58 of FIG. 1. The guide and clamp device 50 is preferably plastic, nylon or Teflon but it may also employ any of a variety of different semi-rigid materials having the desired degree of resiliency.

For a more detailed description of the clamp element 50, however, reference is made to the views depicted in FIGS. 2A, 2B, 2C and 2D. As shown therein, the fiber guide and clamping device 50 is generally cylindrical in shape and consists of two principal functioning portions. In the portion constituting approximately the left one-half of the axial length of the cylindrical body, there are formed a plurality of passageways 61, 62, 63, 64, 65 and 66. These extend in a parallel circular array in the axial direction and are spaced apart by a distance corresponding to the spacing of the guide channels in the hermaphroditic mating portion 35 of the connector half shown in FIG. 1. The purpose of this left half of the clamp body is to fan-out and accurately align the fibers with the channels of the slideable mating piston 35 so that upon sliding movement of the piston member 35 against the spring 42, the fibers slide smoothly within their respective guide channels of the piston member. Any angular and/or radial misalignment between the passageways of the fiber clamp 50 and the piston member 35 increases the possibility of buckling of the fibers within the cylindrical chamber 28.

The guide and clamp device 50 may have a plurality of notches 69 formed about its periphery for mating with interlocking notches formed in the projecting shoulders 55 of the cable retaining plug 20 (not shown). This interdigitation of the clamp device 50 with the plug 20 serves to prevent twisting of the individual optical fibers 14 with each other at their emergence from the cable outer sheath 12A.

For the purpose of clamping the fibers against axial movement within the connector shell 16, the clamping device has a plurality of integral fingers extending outward from the guide portion in two concentric cylindrical groupings. As shown specifically in FIG. 2C, the inner cylindrical grouping of fingers has, in this embodiment, six fingers 71-76 which lie, respectively, immediately inside the conductor paths defined by the passageways 61-66. The inner fingers 71-76 extend for a distance which is approximately half the axial length of the guide and clamp device 50.

For securing the optical fibers against the inner projecting fingers 71-76, there is provided a second cylindrical grouping of fingers consisting of inwardly deflectable fingers 81-86. These fingers form functional clamping pairs with the fingers 71-76, respectively. Interspersed between adjacent ones of the deflectable fingers 81-86 are a plurality of retaining fingers 90-95 which coact with the deflectable fingers 81-86 to form latching elements for the deflectable fingers in a manner described below.

For enclosing the outer fingers 81-86 and 90-95 and providing a snug fit within the connector housing 16, there is provided a cylindrical outer wall 100 substantially surrounding the deflectable fingers and being eccentric thereto. The outer wall 100 may be formed separately from the remaining portions of the clamp element 50, as depicted in FIG. 2D, or it may be an integral portion of the clamp 50 formed from the same block of plastic material. If formed as a separate part, the outer wall 100 preferably projects from one end of the clamping element 50 to the other and includes the notch areas 69 shown in FIGS. 2A and 2B. The inside diameter of the wall portion 100 formed in this manner would be only slightly larger than the outside diameter of the main body of the clamp element containing the fingers 71-76 and 81-86. Preferably the two elements would form a tight fit with each other so that the outer wall 100 would snugly hold the fingers in place and prevent axial and rotational movement thereof relative to the wall 100.

The clamping fingers 71-76 and 81-86 may take any of a variety of configurations. In the preferred form shown in FIGS. 2A-2C, the inner fingers 71-76 are wedge-shaped sectors forming cantilever beams extending from the main body of the clamp element. As such, they are spaced from each other by a short distance depicted at 102, for example. It will be appreciated, however, that the inner fingers 71-76 may be functionally replaced by a solid cylinder, since the deflectable clamping action is provided by the outer fingers 81-86. In the preferred embodiment, however, these fingers 71-76 are separated by spaces sufficient to insure independent movement of the fingers. The resilience of the inner fingers thus limits the clamping force exerted on the fiber by the outer fingers of each pair and prevents damage to the clamped fibers that could otherwise result from excessive deflection pressure on the outer fingers. In either event, the interior ring of retaining surfaces should lie immediately adjacent the passageways 61-66 through which the optical fibers extend. The outer end portions of the deflectable fingers 81-86 are similarly wedge-shaped and are separated from the adjacent retaining fingers by narrow spaces to allow limited inward movement. However, this inward movement is not totally unrestricted but rather is limited by the shape and size of adjacent fingers forming the latching elements as described below. The inner or root portion of each finger 81-86 is narrower than the spacing between adjacent latching fingers to allow free movement therebetween.

FIG. 2B depicts the clamping element in its fully engaged condition in which each of the fingers 81-86 have been deflected inward by a force depicted by the arrows shown thereon. In each instance, the fingers coact with an adjacent finger of the interior ring 71-76 to hold one of the optical fibers 14 in its proper position in the parallel array.

As an important feature of the present invention, the deflectable fingers 81-86 are latched in their engaged position through means shown more specifically in FIG. 2C. Prior to effecting clamping on the fiber, each deflectable finger is in its outer position adjacent the cylindrical outer wall 100. For example, fingers 81 and 82 are shown in this position in FIG. 2C. The fibers resting within the passageways 61 and 62 are unclamped and may slide freely in the axial direction. When it is desired to clamp the fiber in place, a force, as shown at 106 of FIG. 2C, is applied inward against the outer finger. Due to the close spacing and wedge-shaped edges of the outer end portion of the deflectable finger, the inward deflection of the finger causes the adjacent clamping fingers, such as fingers 94 and 95, for example, to deflect sideways under the cam action of the deflectable finger 86. Due to the semi-resilient nature of the latching fingers 94 and 95, the sideways deflection is possible without damage to the fingers themselves. As the clamping finger 86 forces the fiber against the inner finger 76, the inner finger flexes inward slightly to allow overtravel of the finger 86 prior to being latched in its final position. As the finger 86 is deflected further inward, the outside shoulders of the finger 86 slide radially inward beyond the inside shoulders of the adjacent latching fingers 94 and 95 until these shoulders of the deflectable finger pass the latching finger and only the narrow inner portion of finger 86 is disposed between the latching fingers. The latter condition is exemplified by the position of the deflected finger 83 on the right-hand side of FIG. 2C. It its fully deflected position, the finger 83 clamps the optical fiber from the passageway 63 against the interior finger 73, while the adjacent clamping or latching fingers 91 and 92 have snapped back to their original circumferential positions over the adjacent wider end shoulders of finger 83 to latch the deflected finger 83 against the fiber.

To release the optical fiber from its clamped condition between the inner and outer fingers of a finger pair, the user need merely deflect the adjacent latching fingers of the outer row sideways to allow the deflected finger to return to its original position parallel and adjacent to the outer wall 100.

The clamping techniques embodied in the present invention are applicable to arrays of optical fibers other than the circular array shown in FIGS. 2A-2C. For example, an alternate embodiment is shown in FIGS. 3A and 3B in which a plurality of optical fiber passageways 110 and 112 are disposed linearly side-by-side between adjacent finger pairs. As with the embodiment of FIGS. 2A-2C, the clamping element of FIGS. 3A and 3B has a main fiber aligning portion 114, shown to the left of FIG. 3A, through which passageways 110 and 112 extend. The fiber path extending from each of the passageways 110 and 112 projects between a pair of coacting fingers which operate to clamp the fiber and prevent movement in the axial direction in the same manner as for the embodiment shown in FIGS. 2A-2C. To this end, the passageway 110 has adjacent thereto an inner finger 116 of plastic material which forms a cantilever beam with the main body portion 114. Adjacent the finger 116 on the opposite side of the passageway 110 is a deflectable finger 117 which also is cantilevered from the main body 114. For securing the deflectable finger 117 in its deflected position, a pair of adjacent latching fingers 118 and 119 are provided, each of which has an inclined edge portion, 120 and 121 respectively, forming a cam surface against which a pair of angular shoulders 122 and 123 of the finger 117 impinge. As the deflectable finger 117 is deflected inward to clamp the optical fiber against the inner finger 116, adjacent latching fingers 118 and 119 are deflected sideways until the finger 117 is in its fully deflected position. At this point, the latching fingers 118 and 119 snap back over the upper edges of the shoulders defined by the inclined edge portions of finger 117, thus retaining finger 117 in its inwardly deflected position and thereby preventing a lessening of the clamping tension on the fiber. Similarly, the second fiber passageway 112 has an inner finger 130 projecting adjacent thereto in cantilever fashion on which the optical fiber 115 rests. Cooperating with the finger 130 is an outer deflectable finger 131 which operates in the same manner described above for the finger 117. The adjacent latching elements for the finger 131 are the outer finger 119 and an adjacent finger 132. As shown in FIG. 3A, the inner portions of the deflectable outer fingers are narrow and spaced somewhat from their adjacent latching elements to allow the latching elements to return to their original position laterally when the deflectable finger is fully depressed to place the wider end shoulders radially inward of the latching elements. For the deflectable finger 131 these adjacent spaces are depicted at 134 and 135. The upper surface of the deflectable finger is somewhat broader over its distal end shoulder portion as shown in the areas 137 and 138, for example. This insures a snap latching engagement between the deflectable finger 131 and the adjacent fingers 119 and 132.

It will be appreciated that the embodiments shown herein are merely exemplary of the plurality of arrays that may be possible without departing from the spirit and scope of the invention. It will be appreciated from the foregoing that there has been brought to the art an optical fiber connector and clamping element which is inexpensive to manufacture and easy to operate, while at the same time being flexible and adaptable to a wide variety of different fiber clamping applications.

I claim as my invention:

1. A retainer assembly for clamping multiple optical fibers comprising opposed arrays of generally parallel flexible cantilever fingers each supported at its proximal end, one of said arrays comprising deflectable first clamping fingers alternatingly interdigitated with latching fingers, the other of said arrays comprising second clamping fingers arranged in opposition to said first clamping fingers, adjacent portions of said first clamping fingers and said latching fingers including cam portions for laterally deflecting distal portions of the respective adjacent latching fingers as the distal portion of each first clamping finger is deflected toward the respective second clamping finger to clampingly engage an optical fiber therebetween and for latch engagement with said first clamping finger to retain said first clamping finger in its deflected clamping position.

2. A retainer assembly for use in terminating optical fibers comprising a body having at least one entrance for receiving an optical fiber inserted therethrough and a plurality of projecting fingers normally extending parallel to the path of a fiber positioned through said entrance, said fingers being aligned in overlapping relationship to each other on opposite sides of the fiber path and at least one of said fingers being deflectable toward the other so as to secure a finger inserted between said fingers, and means for securing said one finger in its deflected position.

3. A retainer assembly according to claim 2 for terminating optical fibers wherein said body is plastic and unitary in construction and wherein said deflectable finger is a flexible member of said unitary plastic body.

4. A retainer assembly for use in terminating optical fibers comprising a body having at least one entrance for receiving an optical fiber inserted therethrough and a plurality of projecting fingers normally extending parallel to the path of a fiber positioned through said entrance, said fingers being aligned in overlapping relationship to each other on opposite sides of the fiber path and at least one of said fingers being deflectable toward the other so as to secure a fiber inserted between said fingers, said deflected finger being one of a group of said fingers on at least one side of said fiber path, said group of said fingers being parallel and adjacent to each other and including portions that coact with adjacent fingers of said group so as to hold said deflected finger in its deflected position.

5. A retainer assembly according to claim 4 for terminating optical fibers wherein said coacting portions of adjacent fingers are latch elements having mutually engagable cam surfaces and retaining shoulders formed thereon which serve to lock the deflected finger in its flexed position.

6. A retainer assembly for terminating a cable of multiple optical fibers comprising a body having an alignment portion for receiving said multiple fibers and holding them in spaced parallel paths, said body further having a clamping portion consisting of two sets of projecting fingers which coact with each other from opposite sides of the fiber paths so as to clamp said fibers and prevent axial movement thereof relative to the retainer assembly and means for securing said fingers in a clamped position to hold said fibers.

7. A retainer assembly according to claim 6 for terminating a cable of multiple optical fibers wherein said alignment portion holds said fibers in a side-by-side linear array and wherein said coacting sets of fingers are linearly disposed on opposite sides of the fiber paths.

8. A retainer assembly according to claim 6 for terminating a cable of multiple optical fibers wherein said alignment portion laterally spaces said fibers in a parallel circular array and wherein said projecting fingers extend as concentric cylinders on opposite sides of said circular array.

9. A retainer assembly according to claim 8 for terminating a cable with multiple optical fibers wherein one of said inner fingers lies adjacent each fiber path and is semi-rigid and wherein at least one finger of the outer set is deflectable toward said one finger of the inner set to secure a fiber against it.

10. A retainer assembly for terminating a cable of multiple optical fibers comprising a body having an alignment portion for receiving said multiple fibers and holding them in spaced parallel paths, said body further having a clamping portion consisting of two sets of projecting fingers which coact with each other from opposite sides of the fiber paths so as to clamp said fibers and prevent axial movement thereof relative to the retainer assembly, said sets being arranged in concentric circular arrays, the outer set having at least one finger which is deflectable toward at least one finger of said inner set and at least one finger adjacent each of the deflectable fingers of the outer set which coacts with the deflected finger to hold the same in its deflected position.

11. A retainer assembly according to claim 10 wherein each deflectable finger of the outer set and its adjacent finger have mutually engagable cam surfaces and retaining shoulders formed thereon, the cam surfaces being angularly disposed with respect to each other so as to effect slight lateral shifting of the fingers relative to each other as the first of said fingers is deflected toward the fiber path, and said shoulders of adjacent fingers being normally spaced relative to each other such that they engage each other to secure the first of said fingers when it is deflected sufficiently to secure the fiber against a coacting finger of the inner set.

12. A connector assembly for terminating a cable of multiple optical fibers comprising: an outer connector shell; a mating assembly at the distal end of said outer shell for aligning the fibers for engagement with the fibers of a corresponding portion of a mating connector and a cable clamp assembly at the inner end of said outer shell, said clamp assembly consisting of a unitary body having at least one entrance port for axially receiving an optical fiber inserted therethrough and a plurality of projecting fingers normally extending parallel to the axis of said entrance port on either side thereof, said fingers being aligned in overlapping relationship relative to each other on opposite sides of the fiber path and at least one of said fingers being deflectable toward the other so as to secure a fiber inserted between said fingers and means for holding said one finger in its deflected position against said fiber.

13. A connector assembly for terminating a cable of multiple optical fibers comprising:
  an outer connector shell;
  a fiber guide and mating portion operatively associated with one end of said outer shell and having multiple channels for aligning the fibers for engagement with the fibers of a corresponding portion of a mating connector;
  a cable retainer device for guiding and snugly holding the cable as a whole in the opposite end of the said connector body, said device having a channel therethrough for accepting said cable and holding the same in the connector body; and
  a fiber guide and clamping device within said connector body between the mating portion and cable retainer device, the fiber guide and clamping device having a plurality of parallel passages extending through an end portion thereof which lies adjacent the retainer device for receiving the multiple optical fibers from the cable and separating the same into spaced parallel paths axially aligned with the channels of said mating portion, said clamping device having a plurality of opposing fingers extending from said end portion toward said mating portion along the paths of said fibers for deflection toward each other to clamp the fibers to prevent axial movement thereof within the connector body and means for holding selective pairs of said fingers in a clamped position to secure said fibers.

14. A connector assembly according to claim 13 for cables of multiple optical fibers wherein the fingers of said fiber clamping device form cantilever beams integrally connected to the device and deflectable, at least in part, to resiliently engage the optical fibers inserted therebetween.

15. A conductor assembly according to claim 14 for terminating a cable of multiple optical fibers wherein said fiber guide and clamping device is a unitary plastic body having a generally cylindrical guide portion through which said guide passageways are formed and having a plurality of integral fingers extending in cantilever fashion from said cylindrical portion, at least two of said fingers lying parallel to and adjacent each of the fiber paths extending from the passageways, said fingers being deflectable toward each other to resiliently engage the fiber inserted therebetween, said plastic body further having integral means for latching the deflected fingers in their deflected positions to resiliently secure the fibers.

16. A retainer assembly for clamping optical fibers comprising a pair of mutually opposed, generally parallel flexible cantilever fingers each supported at its proximal end, one of said fingers being deflectable by bending of a distal end portion toward the other finger to clampingly engage an optical fiber therebetween, and snap latch means for retaining said distal end portion of said one of said fingers in such deflected clamping position.

17. A retainer assembly for clamping optical fibers comprising a pair of mutually opposed, generally parallel flexible cantilever fingers each supported at its proximal end, one of said fingers being deflectable by bending of a distal end portion toward the other finger to clampingly engage an optical fiber therebetween, and snap latch means comprising a third cantilever finger adjacent and generally parallel to said one of said fingers, said one of said fingers and said third finger including cam portions for laterally deflecting said third finger during deflection of said one finger and to create latch engagement of said third finger with said one finger to retain said one finger in its deflected clamping position.

18. A retainer assembly for clamping optical fibers comprising a pair of mutually opposed, generally parallel flexible cantilever fingers each supported at its proximal end, one of said fingers being deflectable by bending of a distal end portion toward the other finger to clampingly engage an optical fiber therebetween, and snap latch means comprising cantilever latch fingers adjacent each edge of said one of said fingers and generally parallel thereto, said one of said fingers and said latch fingers including cam portions for laterally deflecting said latch fingers during deflection of said one finger and to create latch engagement of said latch fingers with said one finger to retain said one finger in its deflected clamping position.

* * * * *